US011486657B2

(12) United States Patent
Kim et al.

(10) Patent No.: US 11,486,657 B2
(45) Date of Patent: Nov. 1, 2022

(54) HEAT EXCHANGER HEAT TRANSFER PLATE

(71) Applicant: Tranter, Inc., Wichita Falls, TX (US)

(72) Inventors: JongJae Kim, Gyeongsangnam-do (KR); Ronald J. Gowin, Wichita Falls, TX (US); Jason L. Williams, Wichita Falls, TX (US); Robin G. Steininger-Juarez, Wichita Falls, TX (US); Stig Erik Fredrik Thyr, Throllhattan (SE)

(73) Assignee: Tranter, Inc., Wichita Falls, TX (US)

( * ) Notice: Subject to any disclaimer, the term of this patent is extended or adjusted under 35 U.S.C. 154(b) by 258 days.

(21) Appl. No.: 16/502,357

(22) Filed: Jul. 3, 2019

(65) Prior Publication Data

US 2020/0025465 A1 Jan. 23, 2020

Related U.S. Application Data

(60) Provisional application No. 62/699,056, filed on Jul. 17, 2018.

(51) Int. Cl.
*F28F 3/04* (2006.01)
*F28D 9/00* (2006.01)
(Continued)

(52) U.S. Cl.
CPC ............ *F28F 3/046* (2013.01); *F28F 3/08* (2013.01); *F28D 9/005* (2013.01); *F28F 2009/029* (2013.01)

(58) Field of Classification Search
CPC ........ F28F 3/046; F28F 3/08; F28F 2009/029; F28D 9/005
See application file for complete search history.

(56) References Cited

U.S. PATENT DOCUMENTS

| 3,517,733 A | 6/1970 | Tasker, V et al. |
| 3,783,090 A | 1/1974 | Andersson |
| (Continued) | | |

FOREIGN PATENT DOCUMENTS

| CN | 1101418 A | 4/1995 |
| CN | 2890821 Y | 4/2007 |
| (Continued) | | |

OTHER PUBLICATIONS

Translation of Japanese Patent Document JPH0989482A entitled TRANSLATION-JPH0989482A (Year: 1997).*

(Continued)

*Primary Examiner* — Paul Alvare
(74) *Attorney, Agent, or Firm* — Reising Ethington P.C.

(57) ABSTRACT

A plate for a heat exchanger has a longitudinal centerline, a reference plane parallel to the longitudinal centerline, and multiple corrugations provided in the plate that define flow channels through which fluid flows. The corrugations extend at an angle to the reference plane and at least some of the corrugations are intersected by the reference plane, wherein over at least a portion of a surface area of the plate the corrugations are arranged in sub-regions that have a longitudinal length and the corrugations of each sub region are at the same angle relative to the longitudinal centerline, and the corrugations of adjacent sub-regions are at different angles from each other, and wherein the corrugations in adjacent sub-regions meet at junctions and the junctions are not longitudinally aligned.

15 Claims, 10 Drawing Sheets

(51) Int. Cl.
*F28F 9/02* (2006.01)
*F28F 3/08* (2006.01)

(56) References Cited

U.S. PATENT DOCUMENTS

| | | | | |
|---|---|---|---|---|
| 4,125,149 | A * | 11/1978 | Kritzler | F28D 19/042 |
| | | | | 165/10 |
| 4,176,713 | A * | 12/1979 | Fisher | F28F 3/083 |
| | | | | 165/166 |
| 4,249,597 | A | 2/1981 | Carey | |
| 4,434,643 | A * | 3/1984 | Almqvist | B21D 53/04 |
| | | | | 29/890.039 |
| 4,696,342 | A | 9/1987 | Yamauchi et al. | |
| 4,781,248 | A * | 11/1988 | Pfeiffer | F28D 9/005 |
| | | | | 165/166 |
| 4,911,235 | A | 3/1990 | Andersson et al. | |
| 5,226,474 | A * | 7/1993 | Hallgren | B01D 1/221 |
| | | | | 165/110 |
| 5,301,747 | A | 4/1994 | Daschmann et al. | |
| 5,531,269 | A * | 7/1996 | Dahlgren | F28F 3/046 |
| | | | | 165/167 |
| 6,073,687 | A | 6/2000 | Jensen et al. | |
| 6,131,648 | A | 10/2000 | Rasmussen | |
| 6,199,626 | B1 | 3/2001 | Wu et al. | |
| 6,394,178 | B1 * | 5/2002 | Yoshida | F28D 9/005 |
| | | | | 165/166 |
| 6,516,874 | B2 | 2/2003 | Mathur et al. | |
| 6,702,005 | B1 * | 3/2004 | Blomgren | F28D 9/005 |
| | | | | 165/166 |
| 6,991,025 | B2 | 1/2006 | Beatenbough | |
| 7,040,387 | B2 * | 5/2006 | Leuthner | F28F 9/0268 |
| | | | | 165/166 |
| 7,168,483 | B2 | 1/2007 | Blomgren et al. | |
| 7,490,660 | B2 * | 2/2009 | Song | F28F 3/10 |
| | | | | 165/166 |
| 8,087,455 | B2 | 1/2012 | Miao et al. | |
| 8,746,329 | B2 | 6/2014 | Blomgren et al. | |
| 9,217,608 | B2 | 12/2015 | Krantz et al. | |
| 9,400,142 | B2 | 7/2016 | Holm et al. | |
| 9,739,542 | B2 * | 8/2017 | Hedberg | F28F 3/083 |
| 10,724,802 | B2 * | 7/2020 | Courtial | F28F 9/0265 |
| 10,962,308 | B2 | 3/2021 | Sjödin et al. | |
| 2008/0029257 | A1 * | 2/2008 | Nilsson | F28D 9/005 |
| | | | | 165/167 |
| 2010/0258284 | A1 | 10/2010 | Krantz | |
| 2011/0083833 | A1 * | 4/2011 | Zorzin | F28D 9/0093 |
| | | | | 165/166 |
| 2012/0325434 | A1 * | 12/2012 | Blomgren | F28F 3/046 |
| | | | | 165/104.19 |
| 2015/0247682 | A1 * | 9/2015 | Nilsson | F28D 9/0043 |
| | | | | 165/185 |
| 2016/0313066 | A1 | 10/2016 | Andersson | |
| 2017/0016680 | A1 | 1/2017 | Zhang et al. | |
| 2017/0131041 | A1 * | 5/2017 | Blomgren | F28D 9/005 |
| 2018/0274867 | A1 * | 9/2018 | Somhorst | F28D 1/0333 |

FOREIGN PATENT DOCUMENTS

| | | | | |
|---|---|---|---|---|
| CN | 1979076 | A | | 6/2007 |
| CN | 103424024 | A | | 12/2013 |
| CN | 103424025 | A | | 12/2013 |
| CN | 207035928 | U | | 2/2018 |
| DE | 102005010341 | A1 | | 11/2005 |
| EP | 0611941 | B1 | | 12/1999 |
| EP | 2728293 | A1 | | 5/2014 |
| GB | 1035170 | A | | 7/1966 |
| GB | 1460422 | A | | 1/1977 |
| JP | H06109394 | A | | 4/1994 |
| JP | H06241672 | A | | 9/1994 |
| JP | H07243781 | A | | 9/1995 |
| JP | H0989482 | A | | 4/1997 |
| JP | H0989482 | A * | 4/1997 | F28F 3/04 |
| JP | 2000002494 | A | | 1/2000 |
| JP | 2005282961 | A | | 10/2005 |
| TW | 201812230 | | | 4/2018 |
| WO | WO9116589 | A1 | | 10/1991 |
| WO | WO2011133087 | A2 | | 10/2011 |

OTHER PUBLICATIONS

EP Office Action for EP Application No. 19186336.4 dated Feb. 25, 2021, (5 pages).
Partial EP Search Report for EP Application No. 19186336.4 dated Jan. 7, 2020, (12 pages).
CN Office Action for CN Application No. 201910640905.8 dated Jul. 1, 2022, (15 pages).

* cited by examiner

HEAT EXCHANGER HEAT TRANSFER PLATE

REFERENCE TO RELATED APPLICATIONS

This application claims the benefit of U.S. Provisional Application Ser. No. 62/699,056 filed Jul. 17, 2018, the entire contents of which is incorporated herein by reference in its entirety.

TECHNICAL FIELD

This disclosure relates to a heat exchanger and a heat transfer plate.

BACKGROUND

At least some conventional heat exchangers may be classified into two categories, tubular heat exchangers and plate heat exchangers. Plate heat exchangers are manufactured by stacking a plurality of plates, configured in a way so that two fluids, one relatively hot and the other relatively cold, may be passed between alternating channels defined by the plates. The stacked plates are received within a shell having suitable inlet and outlet ports for the two fluids.

SUMMARY

In at least some implementations, a plate for a heat exchanger has a longitudinal centerline, a reference plane parallel to the longitudinal centerline, and multiple corrugations provided in the plate that define flow channels through which fluid flows. The corrugations extend at an angle to the reference plane and at least some of the corrugations are intersected by the reference plane, wherein over at least a portion of a surface area of the plate the corrugations are arranged in sub-regions that have a longitudinal length and the corrugations of each sub region are at the same angle relative to the longitudinal centerline, and the corrugations of adjacent sub-regions are at different angles from each other, and wherein the corrugations in adjacent sub-regions meet at junctions and the junctions are not longitudinally aligned.

In at least some implementations, a lateral direction is defined perpendicular to the longitudinal centerline and the reference plane is parallel to both the lateral direction and longitudinal centerline, and wherein the junctions of the adjacent sub-regions are arranged with some on one side and some on another side of an imaginary line parallel to the longitudinal centerline and extending along the reference plane.

In at least some implementations, the plate includes an inlet area from which fluid enters the flow channels defined by the corrugations, a heat transfer zone and distribution zone located between the inlet area and the heat transfer zone. The distribution zone includes a primary distribution region with corrugations that at least partially define flow channels that extend across lateral extent of the plate where the lateral extent is defined perpendicular to the longitudinal centerline, and the distribution zone includes at least one secondary distribution region located between the primary distribution region and the heat transfer zone. The secondary distribution region has corrugations that at least partially define flow channels that include a transition at a non-zero angle from the flow channels defined by the corrugations in the primary distribution region and that extend at an angle of at least 30 degrees relative to the longitudinal centerline. In at least some implementations, longitudinal dimension of the secondary distribution region is the same across the width of the plate. The secondary distribution region may include multiple sections and each section extends less than one-third of the lateral extent of the plate. Each section of the multiple sections may include corrugations at a different angle than the sections immediately adjacent to said each section.

In at least some implementations, the plate includes an inlet area via which fluid is introduced into the flow channels, and a distribution zone that is located adjacent to the inlet area and which includes corrugations that extend from the inlet area both longitudinally and laterally away from the inlet area where laterally is perpendicular to the longitudinal centerline, and wherein the corrugations in the distribution zone define at least two flow channels that have different cross-sectional areas. The cross-sectional area of the flow channels may change across the lateral extent of the plate with at least some of the flow channels that extend laterally farther from the inlet area having a greater cross-sectional area than some of the flow channels that do not extend as far laterally from the inlet area.

In at least some implementations, a plate for a heat exchanger has a longitudinal centerline, a reference plane parallel to the longitudinal centerline, corrugations that extend at an angle relative to the reference plane and define flow channels through which fluid flows, an inlet area defined at least in part by the plate via which fluid is introduced into the flow channels, and a distribution zone located adjacent to the inlet area. The distribution zone includes corrugations that extend from the inlet area both longitudinally and laterally away from the inlet area where laterally is perpendicular to the longitudinal centerline, and the corrugations in the distribution zone define at least two flow channels that have different cross-sectional areas.

In at least some implementations, the cross-sectional area of the flow channels changes across the lateral extent of the plate with at least some of the flow channels that extend laterally farther from the inlet area having a greater cross-sectional area than some of the flow channels that do not extend as far laterally from the inlet area. The corrugations may extend to peaks that are at the same distance from reference plane.

In at least some implementations, a plate for a heat exchanger has a longitudinal centerline, a reference plane parallel to the longitudinal centerline, corrugations that extend at an angle relative to the reference plane and define flow channels through which fluid flows, an inlet area defined at least in part by the plate via which fluid is introduced into the flow channels, a distribution zone located adjacent to the inlet area and including corrugations that extend from the inlet area both longitudinally and laterally away from the inlet area where laterally is perpendicular to the longitudinal centerline, and a heat transfer zone longitudinally adjacent to the distribution zone. The heat transfer zone includes corrugations that are arranged so that an imaginary line drawn anywhere along the lateral extent of the heat transfer zone and parallel to the longitudinal centerline will intersect with corrugations arranged at at least two different angles relative to the imaginary line.

In at least some implementations, the corrugations in the heat transfer zone are arranged in sub-regions that have a longitudinal length and the corrugations of each sub region are at the same angle relative to the longitudinal centerline, and the corrugations of adjacent sub-regions are at different angles from each other, and wherein the imaginary line will intersect at least two different sub-regions. The corrugations of different sub-regions may meet at junctions and the junctions between two sub-regions are not aligned longitudinally. In at least some implementations, the junctions do not include corrugations from four different angles.

BRIEF DESCRIPTION OF THE DRAWINGS

The following detailed description of preferred embodiments and best mode will be set forth with reference to the accompanying drawings, in which.

DETAILED DESCRIPTION OF PREFERRED EMBODIMENTS

Figure 1A:
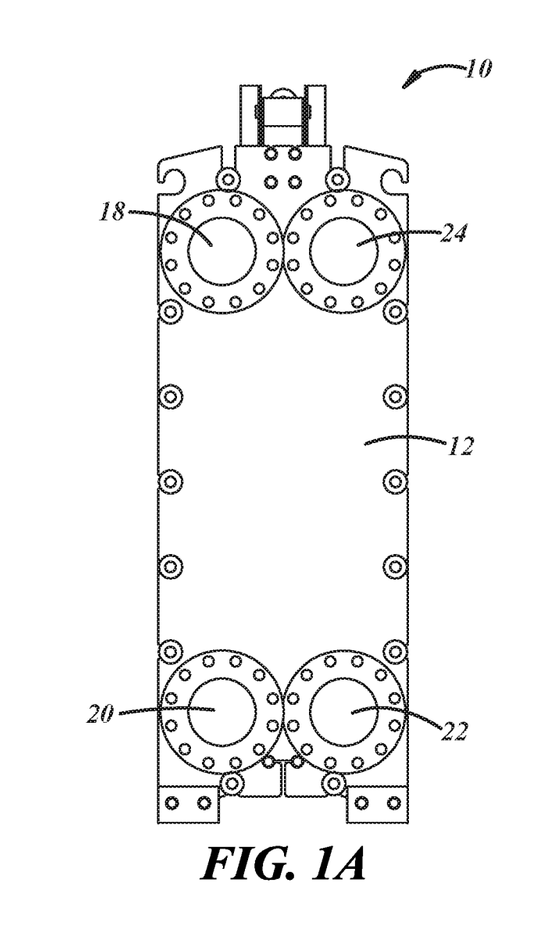
FIGS. 1A and 1B are diagrammatic front and side views of a heat exchanger.
Figure 1B:
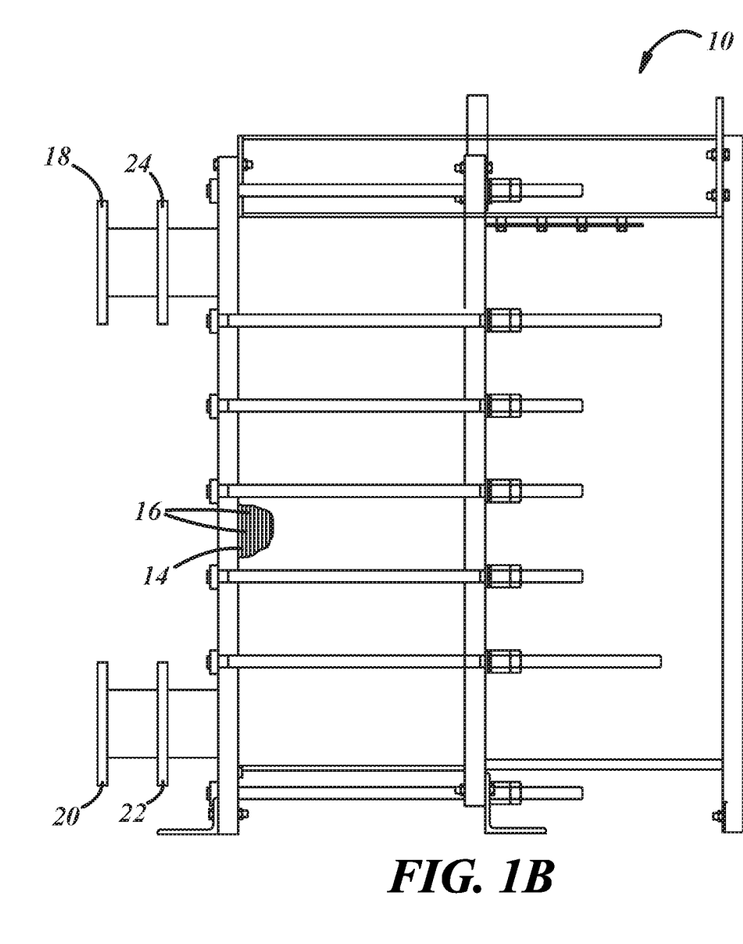

Referring in more detail to the drawings, FIGS. 1A and 1B illustrate one embodiment of a heat exchanger 10 including an outer housing 12 and an inner core 14 (FIG. 1B—shown via a partial broken section of the housing) or plate pack that includes multiple heat exchanger plates 16. The heat exchanger 10 is shown as a plate heat exchanger having a basically rectangular core 14, although other shapes and configurations are possible. The housing 12 may include a first inlet 18, a first outlet 20, a second inlet 22 and a second outlet 24. A first fluid may be received into and exit from the housing 12 via the first inlet 18 and first outlet 20. A second fluid may be received into and exit from the housing 12 via the second inlet 22 and second outlet 24. The fluids may be in heat transfer communication with each other through the intervening or interposed plates 16 of the core 14. The inlets 18, 22 and outlets 20, 24 may be defined by conduits that may be welded to one or more walls of the housing 12, and the walls may be clamped or welded together to define an at least substantially complete enclosure.

The inner core 14 or plate pack may include multiple heat transfer plates 16 that may be generally flat and rectangular, although other shapes may be used. The internal arrangement and construction of the core 14, including the plate pack, can be substantially as disclosed in U.S. Pat. No. 6,516,874, the disclosure of which is incorporated herein by reference in its entirety. In general, a plurality of cassettes may be located within the housing with each cassette constructed from two heat transfer plates 16 sealed together (e.g. by a weld or gasket(s)). In forming a cassette, one of the heat transfer plates 16 may be rotated 180 degrees and turned over so that one of the plates is superimposed upon the other. This causes the corrugations of each of the heat transfer plates 16 to cross each other at a fixed angle, and also defines flow passages between the plates through which fluid flows. The plate pack 14 consists of multiple cassettes stacked together and may be arranged so that the fluid flows in the spaces between each pair of adjacent plates. In at least some implementations, the first fluid flows through the space between every other plate 16 and the second fluid flows through the spaces between the other plates. For example, with plates A, B, C, D and E sandwiched together in a plate pack, the first fluid would flow between plates A and B, and plates C and D. And the second fluid would flow between plates B and C, and plates D and E. Thus, fluid flows on both of the opposed sides (which may be called front and rear) of at least the internal plates (in the simple example, plates B, C and D) of the plate pack, and in the example described, a different fluid flows on the opposed front and rear sides of these plates to improve heat transfer between the fluids and plates.

Figure 2:
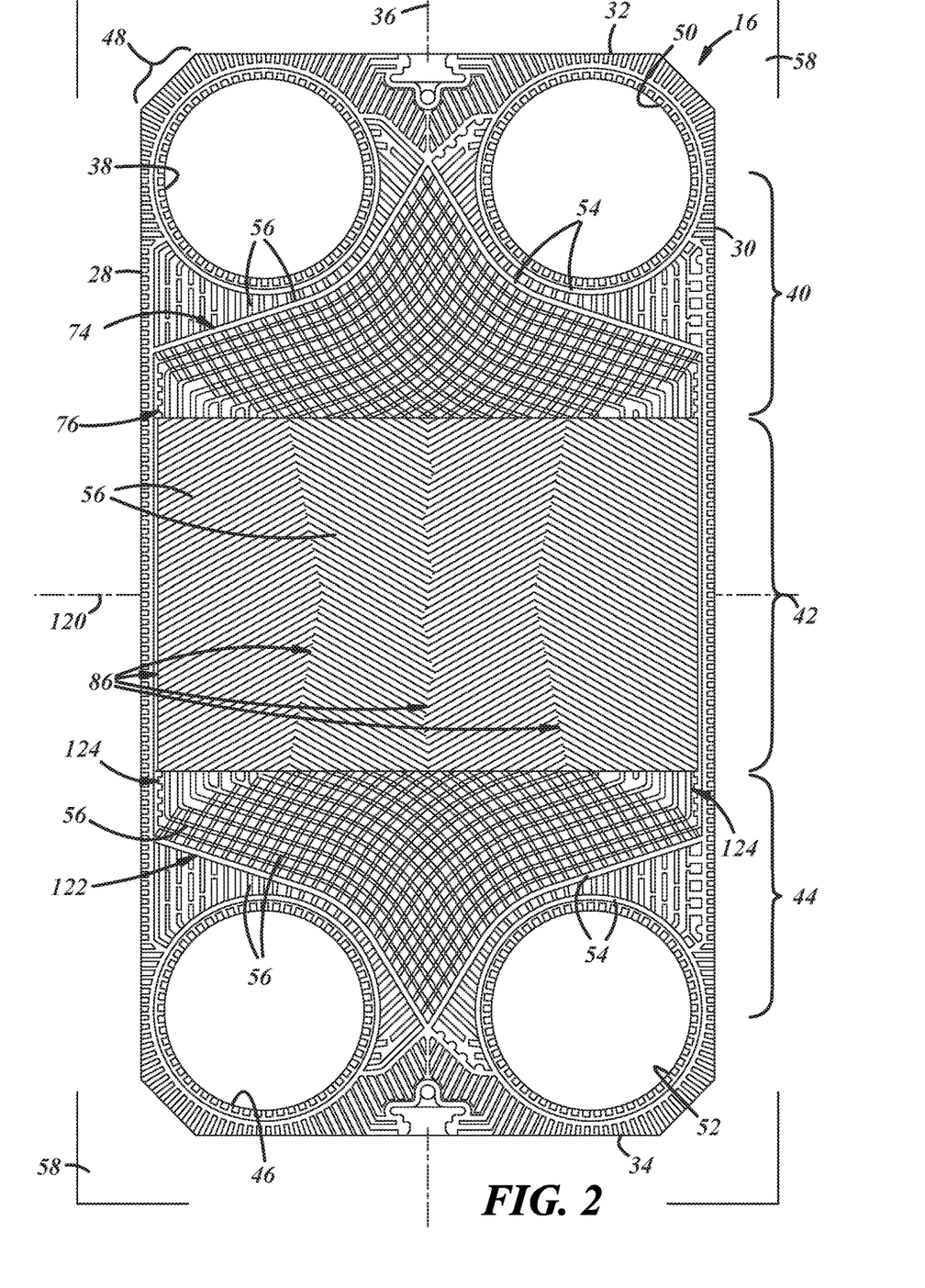
FIG. 2 is a front view of one implementation of a heat transfer plate for a plate-type heat exchanger.
Figure 3:
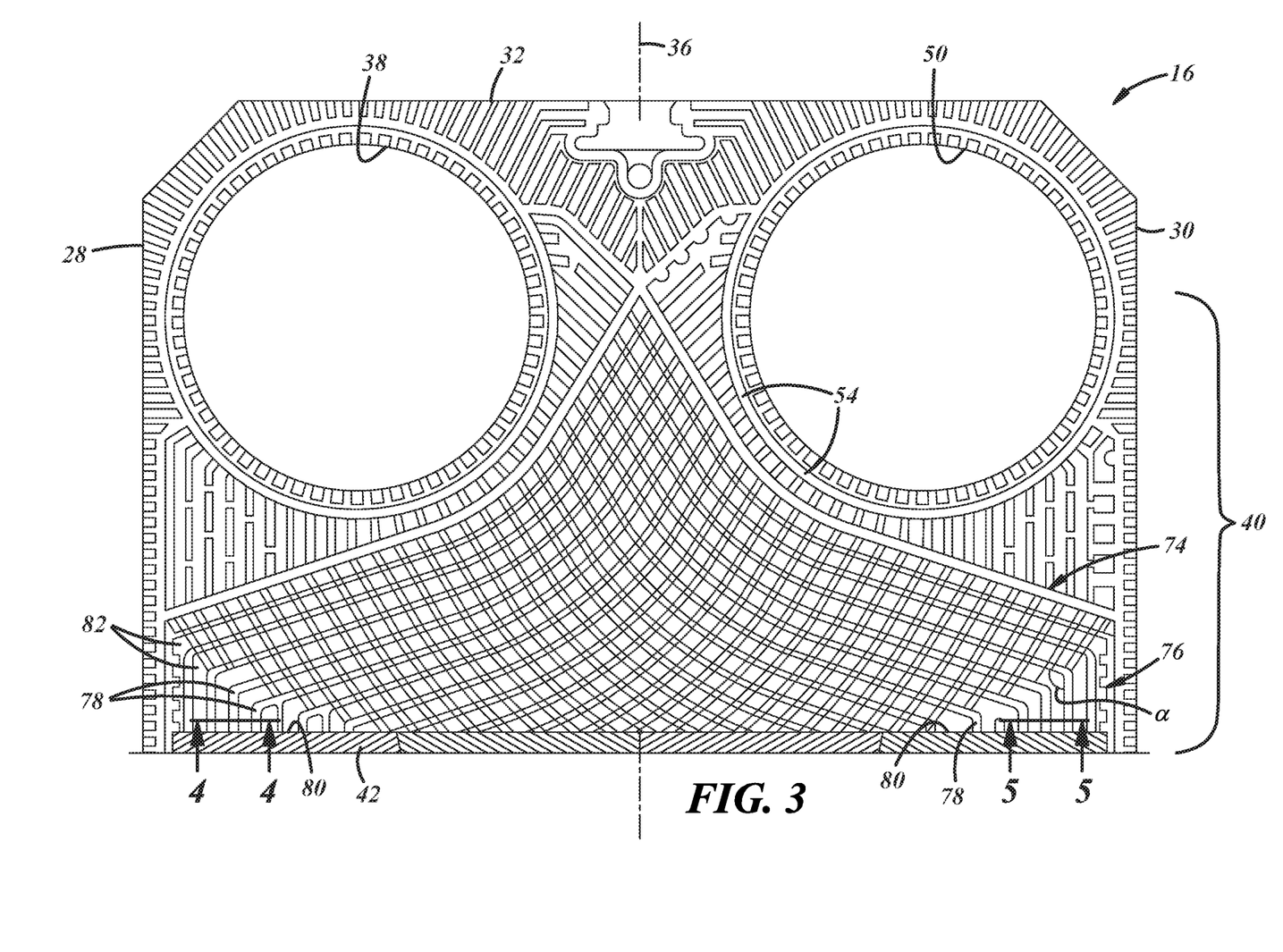
FIG. 3 is an enlarged, fragmentary front view of the plate.
Figure 6:
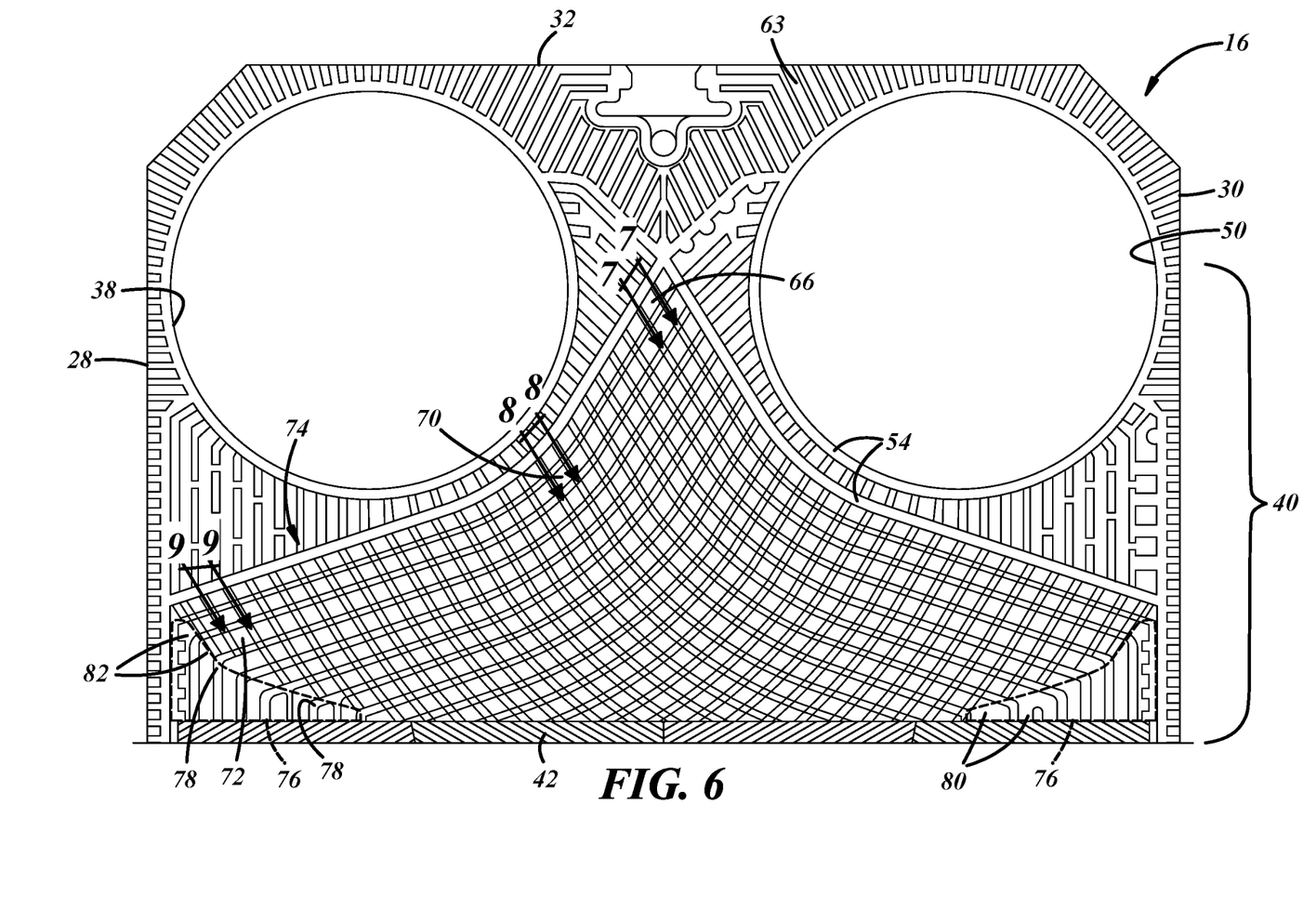
FIG. 6 is a front view of a portion of a plate that may be located immediately adjacent to the plate of FIG. 2.

As shown for example in FIG. 2, each plate 16 may be a thin, generally rectangular sheet of metal, such as stainless steel or titanium. The plate 16 may include parallel first and second side edges 28, 30 on opposed sides of the plate, and parallel first and second end edges 32, 34 at opposed ends of the plate. The side edges 28, 30 define a length of the plate 16 and extend longitudinally or parallel to a longitudinal centerline 36 of the plate 16 and the end edges 32, 34 define a width of the plate 16 and extend laterally, perpendicular to the longitudinal centerline 36. From a first end 32 of the plate 16 toward a second end 34, the plate may include a first opening 38 that serves as an inlet port that is communicated with the first inlet 18 for the first fluid which may be a heat transfer fluid (e.g. water), a diverging fluid distribution zone 40, a middle or heat transfer zone 42, a converging fluid collection zone 44 and a second opening 46 that serves as an outlet port for the heat transfer fluid that is communicated with the first outlet 20. The inlet opening 38 may be located adjacent to but spaced from both the first end edge 32 and the first side edge 28 such that the inlet opening is located near a corner or juncture 48 of the first end edge 32 and first side edge 28 and is enclosed by the plate 16 (i.e. the opening 38 does not extend through an edge of the plate). In this way, appropriate seals (weld/gasket) can be utilized to prevent leakage of the heat transfer fluid from the plate pack 14. The plate 16 may also include a third opening 50 adjacent to the first end and second side edges 32, 30, respectively, and a fourth opening 52 adjacent to the second end and second side edges 34, 30 respectively. The third and fourth openings 50, 52 may be mirrored about the centerline 36 relative to the first and second openings 38, 46, respectively. The third and fourth openings 50, 52 may be provided to facilitate use of the same plate design in different orientations to provide the flow paths described herein (e.g. to communicate with the second inlet 22 and second outlet 24 for the second fluid, sometimes called the working fluid the temperature of which is changed by the heat exchanger). As shown in FIGS. 2, 3 and 6, in at least some implementations, channels 54 for a seal or gasket circumscribe the third and fourth openings 50, 52 to provide a circumferentially continuous seal around these openings designed to prevent fluid flow into those openings.

As noted above, the fluids flow in spaces defined between adjacent plates 16, where the spaces are defined by non-planar features, called corrugations 56 herein, formed in the plates. The corrugations 56 may be formed as drawn or pressed-in channels that are concave when viewed from the front side of the plate 16 and convex when viewed from the rear side, or vice versa. The perimeter/edges 28-32 of the plate 16 may be left flat or planar to facilitate sealing together adjacent plates at the perimeter via welds and/or gaskets as noted above. A reference plane 58 may be defined that is parallel to the centerline 36 and may include the perimeter of the plate 16, as shown in FIG. 2, and the corrugations 56 may extend away from the plane 58 in one or both directions, as desired. In at least some implementations, the plate material between adjacent corrugations 56 may also be moved relative to the reference plane 58 to change the depth of a channel defined between adjacent corrugations 56 in a plate 16. In this way, the peaks 60 (e.g. labeled in FIGS. 7-9) of the corrugations 56, which is the area of a corrugation displaced farthest from the plane 58, may be at the same depth or distance from the plane to facilitate uniform or consistent contact of the corrugations by adjacent plates 16 across the front and rear surfaces of the plate to improve the strength of the plate pack 14.

With the inlet opening 38 located laterally toward a side of the plate 16 (i.e. first or second side 28, 30) as opposed to the lateral middle of the plate 16, it may be desirable in at least some implementations to distribute the heat transfer fluid that flows through the inlet opening 38 across the plate laterally before the fluid flows a significant distance longitudinally. Doing so utilizes more of the surface area of the plate 16 for heat transfer and can improve the heat transfer capacity of the heat exchanger 10. To do this, the fluid distribution zone 40 includes corrugations 56 that extend at different angles relative to the longitudinal centerline 36.

For example, in at least some implementations, corrugations 56 in the distribution zone 40 that communicate with the inlet opening 38 farthest from the first side edge 28 (e.g. closer to the centerline 36) extend, on average, laterally at a greater angle to the centerline 36 than do corrugations closer to the first side edge 28. The average may be an average angle of the flow channel defined by a continuous corrugation 56 along the length of the flow channel from the inlet opening 38 to where the distribution zone 40 ends. Hence, the corrugations 56 and resulting flow passages that communicate with the inlet opening 38 farthest from the first side edge 28 have, in general, a longer length than do the corrugations 56 and associated flow passages closer to the first side edge 28. At least some of the corrugations 56 and passages in the distribution zone may extend beneath the third opening 50 in the plate 16 that is located adjacent to the first end and second side edge 32, 30 respectively, and at least some corrugations 56 may bend in the area of and have a concave shape when viewed from the third opening 50 such that these corrugations 56 and associated channels are not linear or at a constant angle relative to the centerline 36. This permits the channels/corrugations 56 that extend farthest toward the second side edge 30 to curve around the third opening 50 somewhat and to terminate at or closer to the second side edge 30 and at a location closer to the first end 32 than if those channels/corrugations were linear. This may permit more corrugations 56 and channels to extend farther toward the second side edge 30 to improve fluid flow toward the second side edge.

Further, the longer corrugations 56 and channels may have a greater flow area than the shorter channels with a goal of more evenly distributing flow across the plate 16 and avoiding having too much fluid flow straight toward the second end 34 longitudinally from the inlet opening 38. In at least some implementations, the flow area of the channels defined by a corrugation 56 or between adjacent corrugations may vary across the distribution zone 40 by varying one or both of the width of the space between corrugations 56 or the depth of the corrugations, where the width is measured between adjacent corrugations and the depth is the dimension perpendicular to the reference plane 58.

Figure 7:
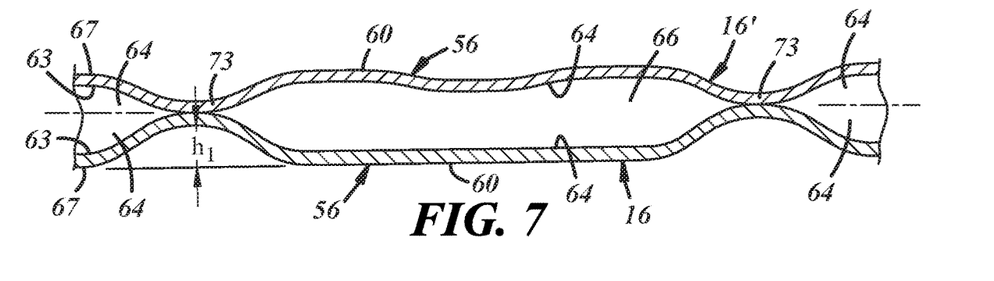
FIG. 7 is a sectional view taken generally along line 7-7 in FIG. 6.
Figure 8:
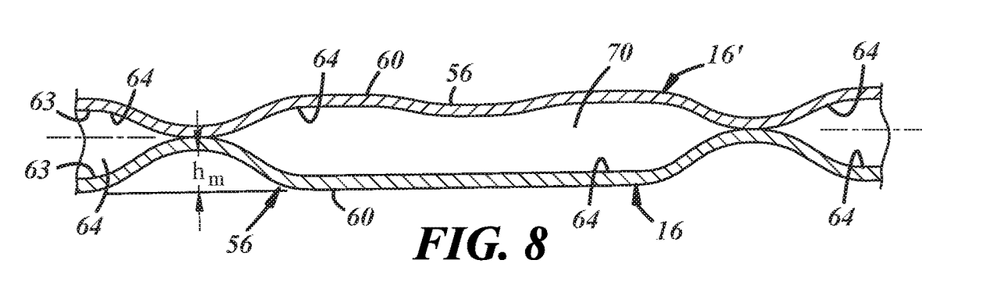
FIG. 8 is a sectional view taken generally along line 8-8 in FIG. 6.
Figure 9:
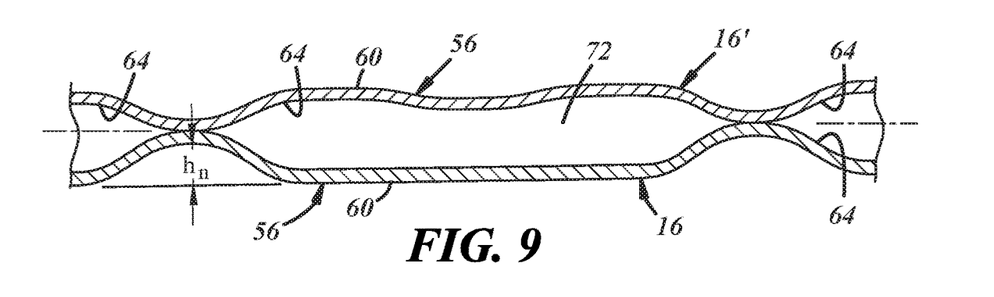
FIG. 9 is a sectional view taken generally along line 9-9 in FIG. 6.

In FIG. 6, the front surface 63 of a plate 16 is shown, and a second plate 16' is received over or on top of this surface in a cassette, as shown in FIGS. 7-9, which are cross-sectional views taken in the area of the arrows labeled 7, 8 and 9 in FIG. 6. The corrugations 56 in the plates 16, 16' of a cassette define open channels 64 that are generally c-shaped in cross-section and extend in desired patterns or directions across portions of the plate. To define flow passages between the plates 16, 16', the corrugations 56 of one plate 16 extend toward and engage the corrugations 56 (or areas between corrugations) of the other plate 16'. In this way, at spaced apart locations the front face 63 of the corrugations on one plate 16 engage the front face 63 of the corrugations on the other plate 16', and an enclosed volume is defined between the engaged corrugations, which enclosed volume defines the flow passages between adjacent corrugations. Looking from the rear face 67 (FIG. 7) of the plate 16 toward the plate 16', the corrugations in plate 16 are convex and the corrugations in plate 16' are concave.

FIG. 7 shows the corrugations 56 that define, and the cross-sectional flow area of, a longer flow passage 66 that defines the passage in the distribution zone 40 that extends closest to the second side edge 30. This passage 66 opens to the inlet opening 38 along a radius (relative to an axis 68 of the inlet opening 38) that is generally perpendicular to the centerline 36 of the plate 16, where "generally" means within 15 degrees of perpendicular to the centerline. Of course, in other embodiments the passage 66 may communicate with the inlet opening 38 at other locations around the periphery of the inlet opening. FIG. 8 shows the corrugations 56 and flow area of a flow passage 70 in about the midpoint of the distribution zone 40. This passage 70 opens to the inlet opening 38 at a radius of the inlet opening that is at an angle of about 45% (plus or minus 15 degrees) relative to the centerline 36. And FIG. 9 shows the corrugations 56 and flow area of a flow passage 72 that is located longitudinally between the inlet opening 38 and the outlet or second opening 46, and is closer to the first side edge 28. The passage 72 communicates with the inlet opening 38 about 20-30 degrees counterclockwise from a radius parallel to the centerline 36 (and extending from the axis 68 toward the second end 34).

In the implementation shown, the flow area of the passages decreases from passage 66 to passage 70 to passage 72, and the length of the passages also decreases from 66 to 70 to 72. Hence, the shortest of these passages 72 has the smallest cross-sectional flow area and the longest passage 66 has the largest cross-sectional flow area. This may facilitate a more even distribution of fluid from the inlet into the various passages in a cassette and across the lateral width of the plate 16. Each passage in the distribution zone 40 may have a different flow area, or groups of adjacent passages may have the same flow area with different groups having different flow areas. In the example shown, the width (distance between corrugations) of each flow passage in the distribution zone 40 is the same or nearly so (e.g. within 15%) and the flow area varies as a function of the depth of the passages, which depth may vary by varying the depth of the corrugations 56 or location of the material 73 (FIG. 7) between the corrugations.

In the example shown, the depth of the corrugations 56 in the plate 16 that define flow passage 66 relative to the material between the corrugations is between 1.5 mm and 2.0 mm (in one example are 1.60 mm), the depth of the corrugations 56 that define the flow passage 70 relative to the material between these corrugations is between 1.25 mm and 1.5 mm (in one example are 1.35 mm), and the depth of the corrugations 56 that define the flow passage 72 relative to the material between these corrugations is between 1.0 mm and 1.25 mm measured along the rear face of the plate 16 (in one example are 1.10 mm). In the example shown, the distance of the corrugation peaks 60 from the reference plane 58 are the same for each passage 66, 70, 72 (and may be the same for all passages in the distribution zone 40) while the distance of the material 73 between the corrugations 56 and the reference plane 58 changes. Of course, differently formed corrugations/flow passages and combinations of different corrugations/flow passages may be used, as desired. The cross-sectional flow area may be constant or generally constant (e.g. within 10%) along the length of the flow passages from an inlet end open to the inlet opening 38 to an opposite outlet end at the end of the distribution zone 40, if desired. In other embodiments, the flow area of one or more flow passages in the distribution zone 40 may change, for example, by varying the distance between corrugations 56 (i.e. width) that define the flow passage(s) or the relative depth of the material between the corrugations along the length of the flow passage.

In at least some implementations, such as that shown in FIGS. 2, 3 and 6, the distribution zone 40 of the plate 16 includes a primary distribution region 74 as described above and one or more secondary distribution regions 76 (outlined by dashed lines in FIG. 6) that are positioned between and fluidly connect portions of the primary distribution region 74 and the main heat transfer zone 42 of the plate 16. In at least some implementations, there are two laterally spaced apart secondary distribution regions 76 that are adjacent to the side edges 28, 30 of the plate 16 and extend laterally less than one-half the lateral extent of the plate. In the example shown in the drawings, the regions 76 extend laterally less than the diameter of the openings 38, 46, 50, 52 in the plate. A first secondary distribution region 76 is located longitudinally below the first opening 38 and a second secondary distribution 76 region is located longitudinally below the third opening 50. In or adjacent to the secondary distribution regions 76, the corrugations 56 may include a bend 78 or transition from the primary distribution region 74 so that outlets of the flow channels or passages in the secondary distribution region 76, which lead to the main heat transfer zone 42, are parallel to or substantially parallel (e.g. within 15 degrees) to the centerline 36. In at least some implementations, an included angle α (FIG. 3) defined by the corrugations 56 at the bend 78 is between 90 and 145 degrees. The change to a substantially longitudinal direction of the corrugations and associated flow channels may improve the flow of fluid at the outer edges (e.g. adjacent to the first and second side edges 28, 30) of the plate 16 and inhibit fluid from migrating inward toward the centerline 36 and away from the side edges.

Further, the outermost passages in each of the second distribution regions 76 may be longer than the other passages, and the passages closer to the centerline 36 may become shorter to, among other things, provide room for the adjacent flow passages in the primary distribution region 74 to be received partially longitudinally between an adjacent flow passage and the main heat transfer zone 42. In at least some implementations, the outlets 80 (FIGS. 3 and 6) of the passages in the secondary distribution regions 76 may end at the same longitudinal area with the inlets 82 being located at different longitudinal areas (e.g. farther from the first end 28 moving from the side edge 28 or 30 toward the centerline 36). Thus, the secondary distribution regions 76 may be generally triangularly shaped with the laterally inward most flow passage in the secondary distribution regions 76 being the shortest and transitioning smoothly to the adjacent flow passage of the primary distribution region 74 that leads directly to the main heat transfer zone 42.

Figure 4:
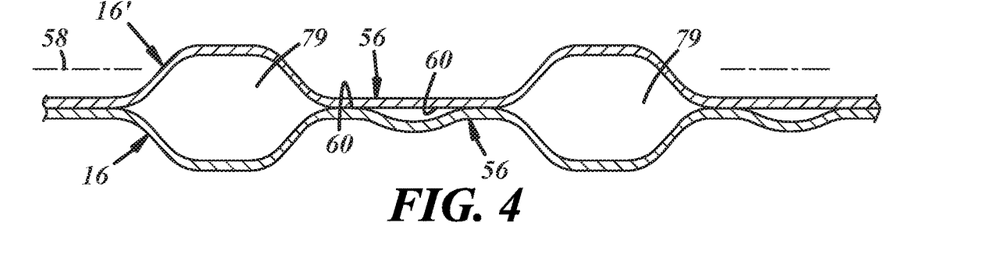
FIG. 4 is a sectional view taken generally along line 4-4 in FIG. 3.
Figure 5:
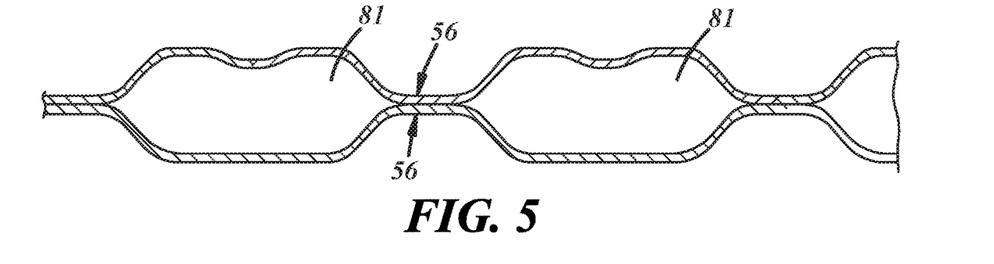
FIG. 5 is a sectional view taken generally along line 5-5 in FIG. 3.

As shown in FIGS. 4 and 5, the flow area of the flow passages within the secondary distribution regions 76 may be different. In at least some implementations, the flow area of the passages in the secondary distribution region 76 closer to the inlet opening 38 is less than the flow area of the passages in the other secondary distribution region 76. This is represented in the embodiment shown in the drawings by passages 79 in FIG. 4 and passages 81 in FIG. 5. Such an arrangement may comparatively facilitate flow in the secondary distribution region that is farther from the inlet opening 38, and comparatively inhibit fluid flow through the secondary distribution region 76 closer to inlet opening 38 to promote fluid flow laterally across the plate 16 rather than just longitudinally below the inlet 38. Further, as shown in FIGS. 4 and 5, the flow passages may be defined by aligned corrugations 56 that are concave relative to each other rather than convex relative to each other as shown in FIGS. 7-9 with regard to the flow passages within the primary distribution region 74. In the secondary distribution regions 76, the flow passages may be closed by engagement of relatively flat portions of the plates 16 that are engaged with each other outboard of the flow passages 79, 81. Of course, the corrugations 56 in either distribution region 74, 76 may be defined by spaces between the plates 16 that are defined by any arrangement of corrugations, as desired. The primary distribution region 74 distributes fluid from the inlet opening 38 across the lateral extent of the plate 16 and the secondary distribution regions 76 direct fluid flow adjacent to the side edges 28, 30 of the plate 16 to further distribute or maintain a desired distribution of fluid across the lateral extent of the plate. The flow areas in the secondary distribution regions may be the same or different. In at least some implementations, the secondary distribution region nearest the inlet opening 38 (e.g. near the first side edge 28 in the illustrated example) may have corrugations with smaller flow areas than the corrugations in the other secondary distribution region to promote or encourage flow away from the inlet opening 38 and more evenly distribute fluid across the plates. In at least some implementations, the flow area of the secondary distribution region farthest from the inlet opening 38 may be 1.5 to 2.2 times greater than the flow area of the secondary distribution region nearer the inlet opening 38. Fluid that exits from the distribution regions 74 and 76 flows into the main heat transfer zone 42 of the plate 16.

Figure 10:
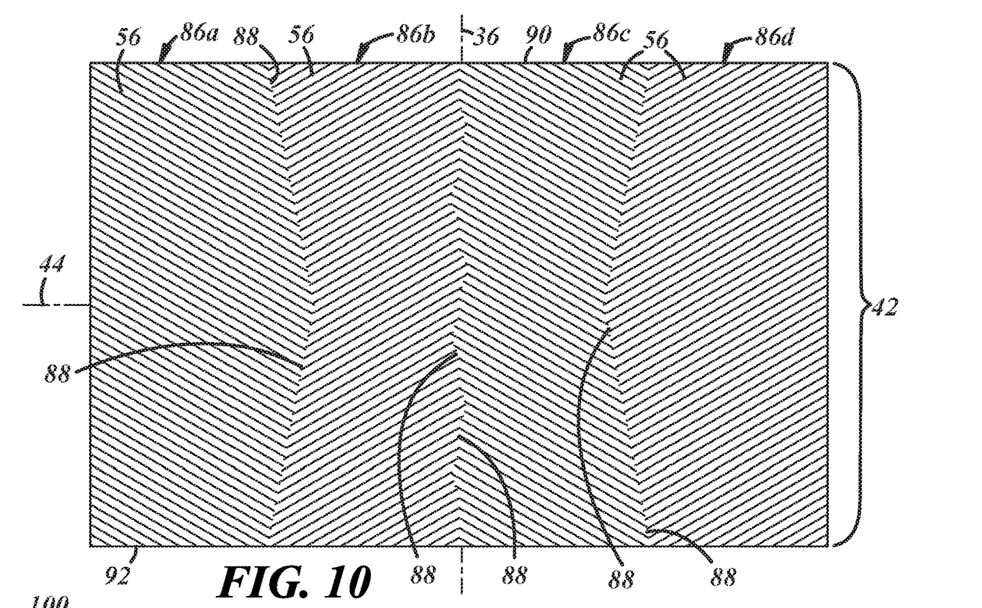
FIG. 10 is a front view of a mid-portion of the plate of FIG. 2.

As shown in FIGS. 2 and 10, the main heat transfer zone 42 of the plate 16 may extend across the entire lateral extent of the plate 16 (between welds or seals at or near the edges 28, 30 and not necessarily to the peripheral edges) and any desired longitudinal extent between an inlet end 28 and an outlet end 30 and may be arranged longitudinally between the openings 38, 46, 50, 52. In at least some implementations, the main heat transfer zone 42 comprises between ¼ to ½ of the longitudinal extent of the plate 16. In the implementation shown, the heat transfer zone 42 comprises about ⅓ of the longitudinal extent of the plate 16, the first and third openings 38, 50 and the distribution regions 74, 76 extend about ⅓ of the longitudinal extent of the plate as do the collection zone 44 and the second and fourth openings 46, 52. Of course, other arrangements and proportions may be used. The heat transfer zone 42 includes a plurality of corrugations that may define separate flow passages that are arranged closely adjacent to each other to increase heat transfer across the plate 16 between the fluids and the plate. The heat transfer zone 42 may include flow passages arranged at an angle of between 20 and 70 degrees relative to the centerline 36. In at least some implementations, the flow passages are linear and have a length that extends partially across the lateral and longitudinal extents of the plate 16, and the flow passages intersect or are open to other flow passages to enable mixing and more turbulent flow of fluid in the main heat transfer zone 42.

In this regard and as shown in FIG. 10, the heat transfer zone 42 may include multiple sub-regions 86 with passages in at least one of the sub-regions 86 arranged at different angles from passages in other sub-regions. To promote mixing of the fluid to increase heat transfer, sub-regions 86 adjacent to the side edges 28, 30 may be arranged to direct fluid toward the centerline 36 and sub-regions at or closer to the centerline 36 may direct fluid toward the side edges 28, 30. At least some of the flow channels or corrugations of adjacent sub-regions 86 intersect each other at junctions 88 at which the fluid flowing in the passages is mixed together as the fluid continues to flow toward the second end 30 of the plate 16. In at least some implementations, the junctions 88 between flow channels or corrugations of two adjacent sub-regions 86 are not aligned longitudinally. Also in at least some implementations, an imaginary and straight line cannot be drawn that includes each junction 88 between passages of two adjacent sub-regions 86 where the line extends from the inlet end 90 (e.g. the end closer to end 28 of plate 16) of the main heat transfer zone 42 to the outlet end 92 (e.g. the end closer to end 30 of plate 16).

In the example shown, the main heat transfer zone 42 includes 4 sub-regions 86a, 86b, 86c, 86d (FIG. 10) and each sub-region 86a-d may extend the full longitudinal extent of the main heat transfer zone 42 and a portion of the lateral extent. The sub-regions 86a-d may be in a herringbone arrangement in which adjacent sub-regions 86 include passages at different angles. As shown, first and third sub-regions 86a and 86c include passages rotated counterclockwise relative to the centerline 36 by 60 degrees or less (e.g. shown as about 30 degrees) and the second and fourth sub-regions 86b and 86d include passages rotated clockwise relative to the centerline 36 by 60 degrees or less (e.g. shown as about 30 degrees). The location of the junction 88 between the corrugations or channels first sub-region 86a and second sub-region 86b may vary laterally along the longitudinal extent of the heat transfer zone 42, with junctions 88 from the inlet end 90 to a midpoint 94 of the heat transfer zone 42 being consecutively laterally closer to the centerline 36 and junctions 88 from the midpoint 94 to the outlet end 92 being consecutively laterally farther from the centerline 36. The first sub-region 86a may thus be shaped like a pentagon (the sides of which need not be linear, but are nearly so in the example shown). Of course, the junctions 88 between the first sub-region 86a and second sub-region 86b may follow a different path, as desired. The fourth sub-region 86d may be a mirror image of the first sub region 86a, and the junctions 88 between the third and fourth sub-regions 86c, 86d may likewise be a mirror image of the junctions 88 between the first and second sub-regions 86a, 86b. The junctions 88 between the second and third sub-regions 86b, 86c may be staggered along the longitudinal length of these sub-regions. Some of the junctions 88 may be on one side of centerline 36 (or other longitudinal line) and other of the junctions 88 may be on the other side of the centerline 36 (or other longitudinal line), and this may be done in a saw-tooth type manner, if desired.

The total amount of lateral deviation of the junctions 88 may be greater between the first and second sub-regions 86a, 86b (and third and fourth sub-regions 86c, 86d) than between the second and third sub-regions 86b, 86c. The second and third sub-regions 86b, 86c may be generally bow-tie shaped collectively, and define a hexagon, with the individual sub-regions 86b, 86c shaped like a pentagon. If desired, the draw depth and flow area of the passages in the main heat transfer zone 42 may be the same throughout the heat transfer zone 42. In at least some implementations, the flow area of in the heat transfer zone 42 may be uniform and may be greater than in the distribution and collection zones. Of course, the channels/passages in the heat transfer zone 42 may have the same or varied flow areas to control fluid flow as desired. Also, the sub-regions may have other shapes than as shown in the drawings and may be provided in any desired number and arrangement.

It has been found, in at least some implementations, that the velocity of fluid flow may decrease in the area of a junction or transition between flow passages, that is, where the fluid is mixed with other fluid and/or changes direction, and that fluid may stagnate when multiple, consecutive, longitudinally spaced junctions or transitions (e.g. three or more) are aligned laterally. Accordingly, it may be desirable to laterally stagger or offset adjacent junctions between the sub-regions 86 as noted above or otherwise to reduce the tendency of fluid to stagnate or slow down undesirably as the fluid flows longitudinally across the plate 16.

When fluid exits the main heat transfer zone 42, the fluid enters a collection zone 44 as shown in FIG. 2. The collection zone 44 may have corrugations/flow passages arranged to direct all fluid toward and into the second opening 46. The collection zone 44 may be the mirror image about a lateral centerline 120 of the distribution zone 40, and may include a primary collection region 122 (that corresponds to the primary distribution region 74) and one or more secondary collection regions 124 (that correspond to the secondary distribution regions 76). The corrugations in the collection zone 44 may be the inverse of the corrugations in the distribution zone 40, that is, the corrugations on the front surface of the plate 16 in the collection zone 44 may match the corrugations on the back surface of the plate in the distribution zone 40. In general, the flow passages converge from the full lateral extent of the heat transfer zone 42 to the outlet opening 46 to route fluid to the outlet opening 46.

Figure 11:
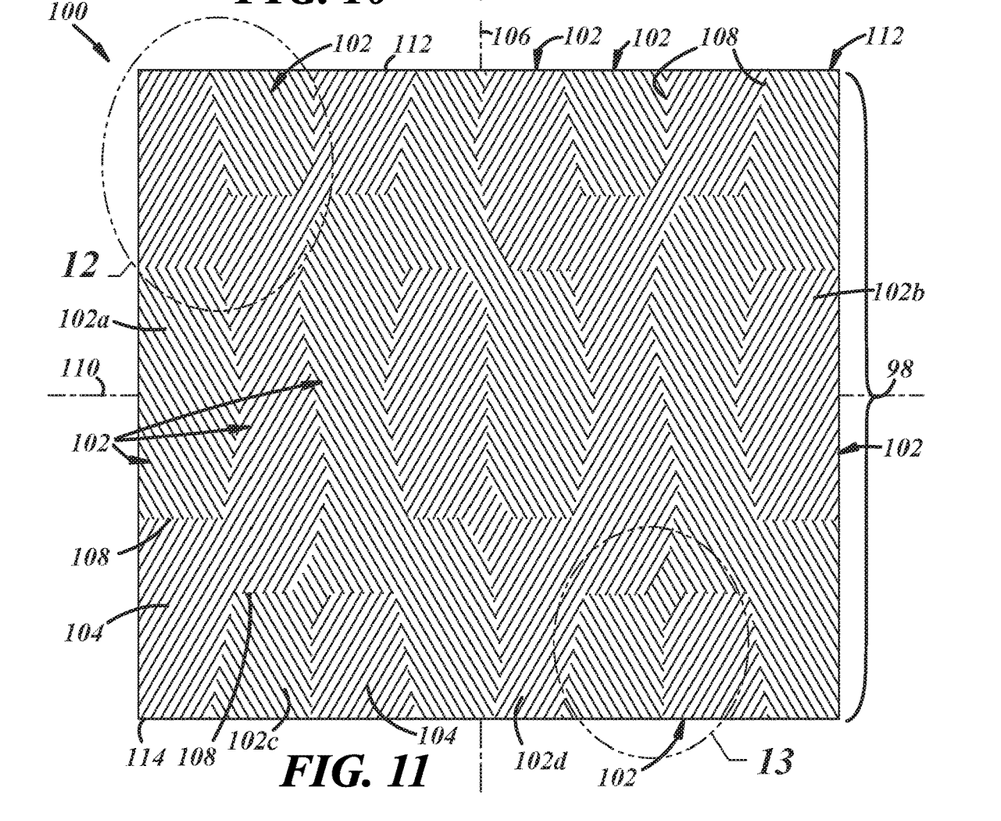
FIG. 11 is a front view of a mid-portion of a plate with an alternate pattern of corrugations.

FIG. 11 shows a main heat transfer zone 98 of an alternate plate 100, that includes multiple sub-regions 102 with flow passages arranged at different angles than flow passages in adjacent sub-regions. The sub-regions 102 may have irregular shapes and there may be multiple (e.g. at least two) different shapes among the sub-regions up to and including each sub-region having a different shape than all others. The flow passages may be defined by corrugations 104 in the plate 100 that extend at an angle to a longitudinal centerline 106 (and usually not parallel to the centerline 106). The angles at which the flow passages extend may vary among the sub-regions 102, as desired. In the example shown, a plurality of sub-regions 102 have flow passages at an angle of about 30 degrees clockwise from the centerline 106 and the remainder of the sub-regions 102 have flow passages at an angle of 60 degrees or less and shown as about 30 degrees counterclockwise from the centerline 36. Of course, other angles may be used, including angles between 15 and 60 degrees (clockwise and counterclockwise from the centerline). In at least some implementations, none of the sub-regions 102 extends the full longitudinal extent of the heat transfer zone 98, and/or none of the sub-regions 102 extends the full lateral extent of the heat transfer zone 98. Instead, the sub-regions 102 are interrupted or intersected by other sub-regions.

In at least some implementations, a straight line parallel to the centerline 106 and extending the full longitudinal extent of the plate 100 intersects at least two different sub-regions 102, with the flow passages of each sub-region 102 intersecting such a line alternating in direction relative to the centerline 106 (e.g. at least one rotated clockwise and one counterclockwise relative to the centerline). As shown in the illustrated embodiment, a straight line intersects at least three sub-regions 102. In at least some implementations, as noted above with regard to the plate 16 shown in FIG. 2, the junctions 108 between passages of adjacent sub-regions 102 are staggered relative to the centerline 106, that is, the junctions between two sub-regions 102 are not all along a line parallel to the centerline 106. Further, in at least some implementations, a straight line parallel to the lateral centerline 110 intersects at least three different sub-regions 102, and in the illustrated embodiment of FIG. 11, at least four different sub-regions. In at least some implementations, the junctions 108 between intersecting flow passages are limited so that each junction area includes flow passages leading to the junction 108 from no more than three directions and in some implementations only two directions, to limit the number of directions in which material of the plate 100 must flow when forming the corrugations 104. Limiting the directions of material flow can reduce the stress in areas of the plate 100 and enable production of a flatter plate and more consistent plates among a production run of plates.

Certain sub-regions 102 may be mirror images of other sub-regions about the centerline 106, for example. In the embodiment of FIG. 11, this is true of the sub-regions labelled 102a and 102b. Other sub-regions may be mirrored or flipped about both centerlines 106 and 110. In the embodiment of FIG. 11, this is true of the sub-regions labelled 102c and 102d. Further, some sub-regions may span from the inlet end 112 to the outlet end 114 of the heat transfer zone 98, but in at least some implementations, the sub-regions do not extend continuously along a straight line that is parallel to the centerline 106 and one or more portions of the sub-region are laterally offset from other portions of the sub-region. With the sub-regions somewhat uniformly distributed across the heat transfer zone 98, a similar flow area is provided by flow passages rotated clockwise relative to the centerline 106 as by flow passages rotated counterclockwise relative to the centerline 106.

Figure 12:
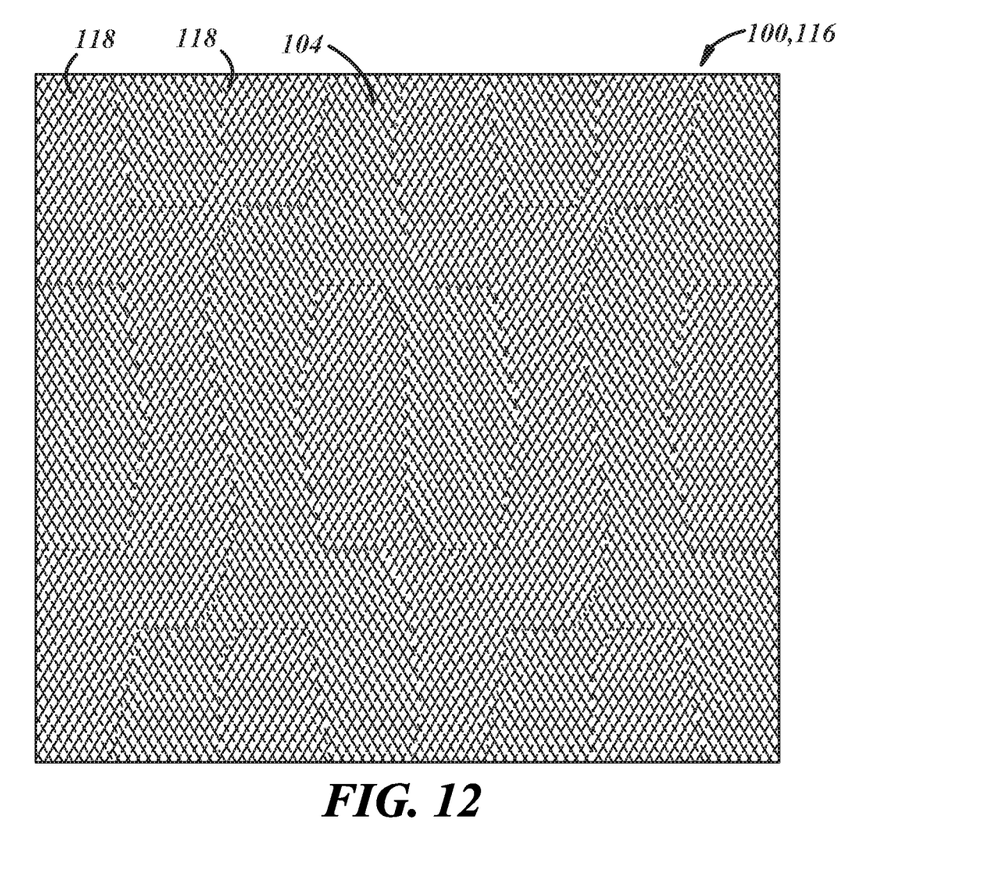
FIG. 12 is a schematic view showing overlap and contact points of two adjacent plates in a mid-portion as shown in FIG. 11.

Further, as shown in FIG. 12, when another plate 116 is placed on top of the plate 100 and flipped/rotated as noted above, the overlapped corrugations 104 of adjacent plates 100, 116 are at different angles and are engaged at mechanical contact points 118 providing multiple discrete contact points along each corrugation. The contact points 118 can be evenly spaced apart and relatively close together to provide strong cassettes and plate packs in general that are capable of being used with fluids under relatively high pressure. Hence, the plates 100 are relatively uniformly engaged by adjacent plates on both sides in a plate pack to provide a strong plate pack (and outer plates of the pack may be engaged and supported by walls of the heat exchanger shell or housing.

Figure 13:
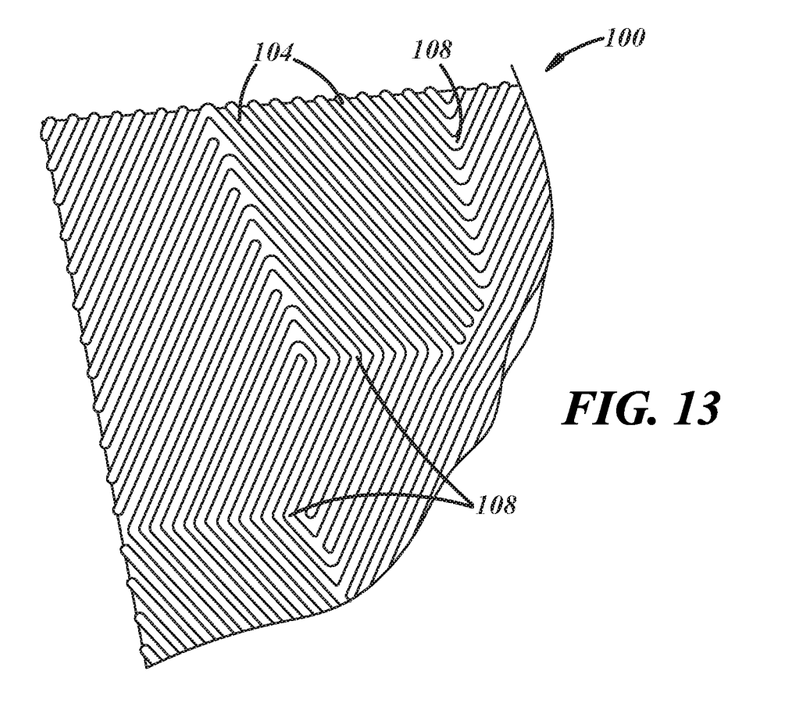
FIGS. 13 and 14 are fragmentary front views of certain areas in the mid-portion of the plate of FIG. 11.
Figure 14:
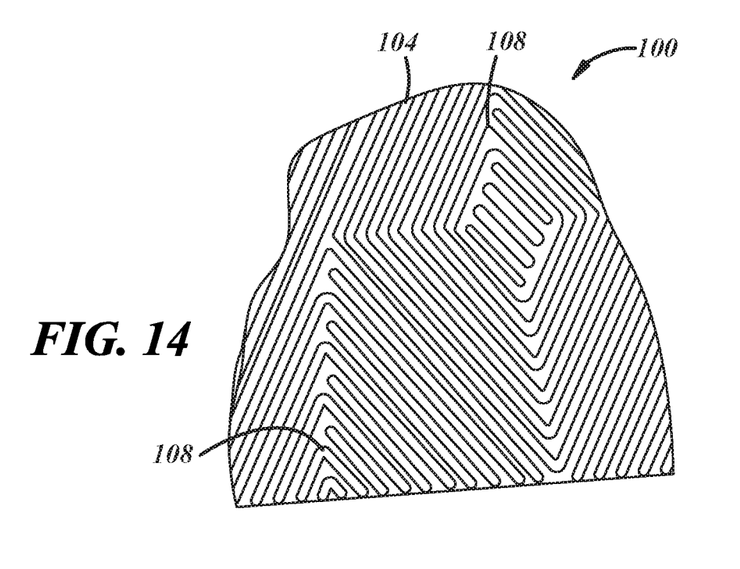

FIGS. 13 and 14 illustrate portions of the main heat transfer zone 98 of the plate 100 shown in FIG. 11. In this plate, instead of the corrugations being formed in straight, linear segments that terminate at each end of the segment, at least some of the corrugations 104 are circuitous and define multiple straight segments joined together by transitions or bends. That is, the corrugations 104 have a linear segment, at least one turn, transition or bend and then another linear segment after the bend. Corrugations 104 may have multiple bends or just one bend, as desired. Further some or all of the bends may be at an angel of 180-degrees such that the linear segments on either side are parallel, or some or all of the bends may be at other angles. One example is a 60-degree bend wherein the linear segments on either side of the bend are in different sub-regions and the bend defines a junction between the sub-regions. Thus, a corrugation may extend into and be part of two or more than two sub-regions, if desired.

Figure 15:
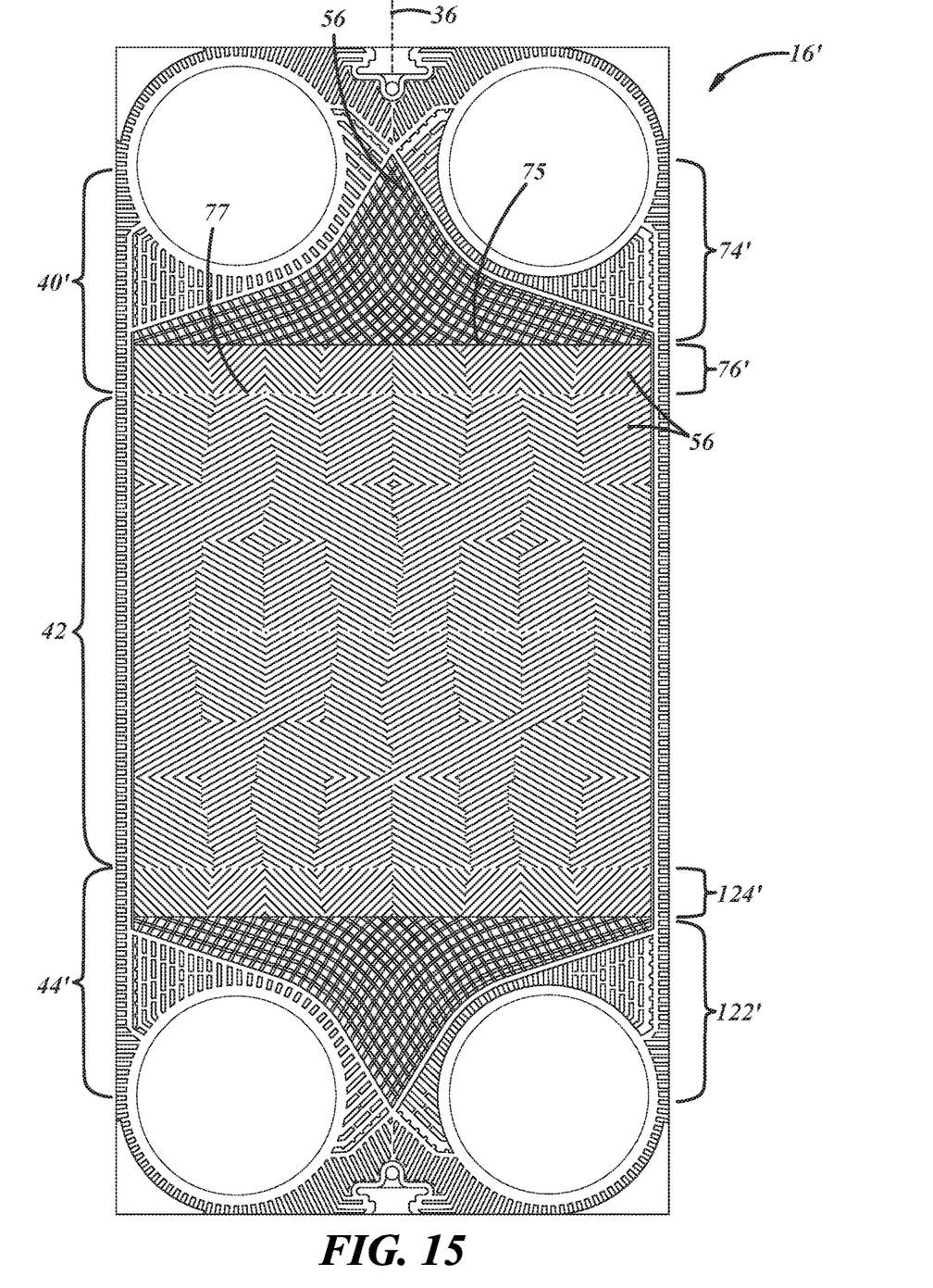
FIG. 15 is a front view of a plate.
Figure 16:
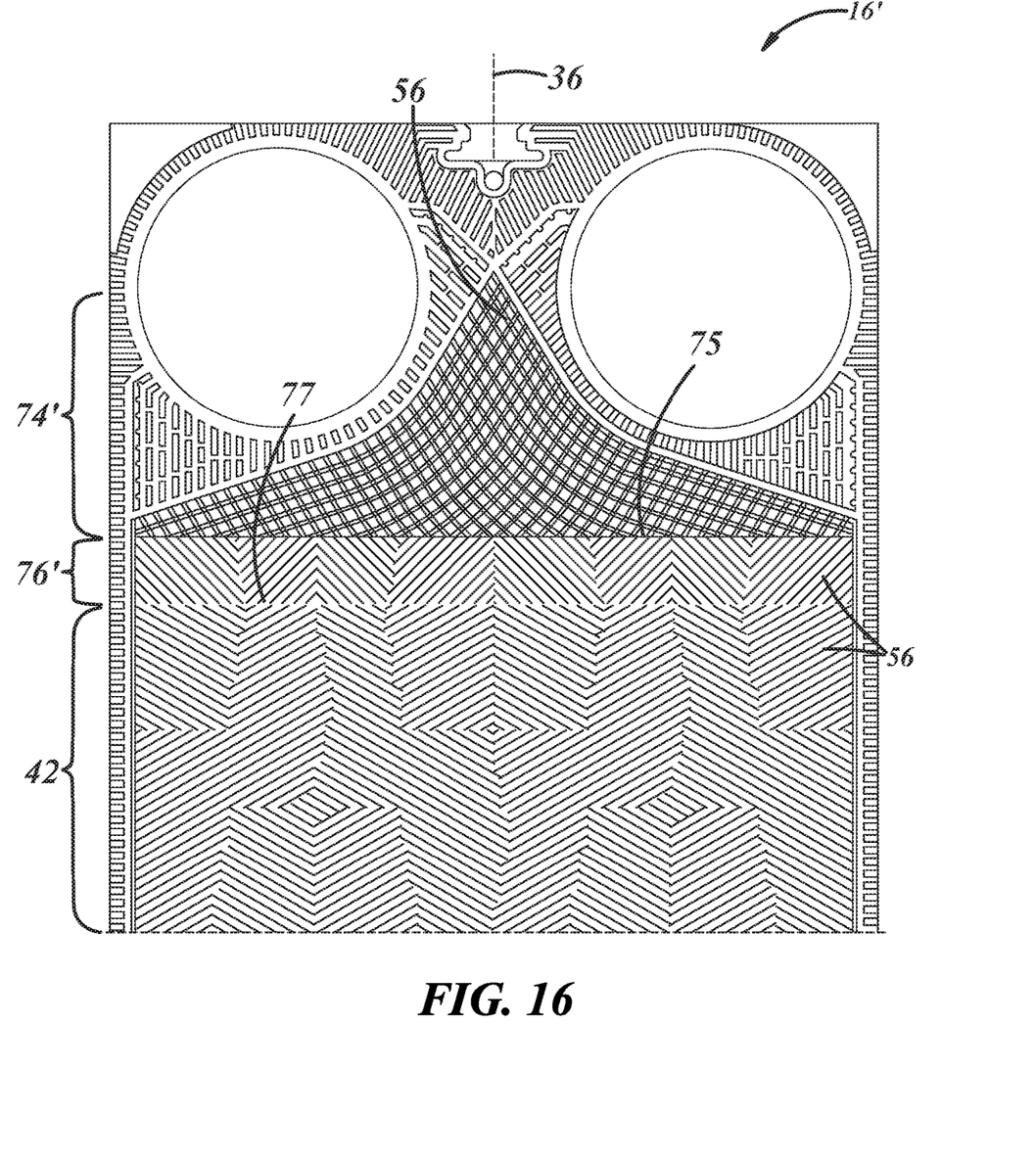
FIG. 16 is an enlarged, fragmentary front view of a portion of the plate in FIG. 15.

FIGS. 15 and 16 illustrate a plate 16' having corrugations 56 of a different configuration in a portion of the plate. In more detail, the distribution zone 40' may include a secondary distribution region 76' that does not include generally triangular areas with passages of differing longitudinal length. Instead, the primary distribution region 74' diverges to the secondary distribution region 76', that is located between the primary distribution region 74' and the heat transfer zone 42, without the triangular portions described above and without passages that are parallel to the centerline 36.

In this example, the secondary distribution region 76' has a longitudinal dimension (i.e. length measured parallel to the centerline 36) that may be relatively constant across the width of the plate. A transition 75 between the primary distribution region 74' and the secondary distribution region 76' (e.g. where the two regions converge or meet) may be generally perpendicular to the centerline 36 (e.g. perpendicular to or within 10 degrees of perpendicular to). Likewise, a transition 77 between the secondary distribution region 76' and the heat transfer zone 42 may be generally perpendicular to the centerline 36 (e.g. perpendicular to or within 10 degrees of perpendicular to).

Corrugations within the secondary distribution region 76' may be arranged at angles that are not the same as the angle(s) of corrugations at the transition from the primary distribution region 76' and at the transition to the heat transfer zone 42. In the example shown, the secondary distribution region includes corrugations at an angle of 45 degrees relative to the centerline 36, although other angles may be used, with a range of 30 degrees to 60 degrees being illustrative but not limiting. Further, the corrugations within the secondary distribution region 76' may be provided in numerous sections of any desired width (direction perpendicular to the centerline 36), and the sections may be of the same width or of different widths. The sections may each span less than one-third of the lateral extent (e.g. the width) of the plate. Further, the corrugations between adjacent sections may be arranged at different angles. In the example of FIGS. 15 and 16, adjacent sections have corrugations at opposite, 45 degree angles. Of course, other angles and arrangements may be used. Still further, the outermost sections (width-wise) of the secondary distribution region 76' may be angled inwardly, toward the centerline. That is, a first end of the corrugation may be located farther from the centerline 36 than a second end of the corrugation, where the second end is adjacent to the heat transfer zone 42.

The collection zone 44' includes a secondary collection region 124' that may be provided between the heat transfer zone 42 and the primary collection region 122'. The primary collection region 122' and secondary collection region 124' may be formed similarly to the primary distribution region 74' and secondary distribution region 76', respectively. The corrugations of the outermost sections (width-wise) of the secondary collection region 124' may be oriented to move fluid toward the centerline 36, that is, a first end of the corrugation may be located farther from the centerline 36 than a second end of the corrugation, where the first end is adjacent to the heat transfer zone 42. The remainder of the plate 16' may be the same as the plate 16 described above.

In at least some implementations, a plate for a heat exchanger has a longitudinal centerline, a reference plane parallel to the longitudinal centerline, and multiple corrugations provided in the plate that define flow channels through which fluid flows. The corrugations extend at an angle to the reference plane and at least some of the corrugations are intersected by the reference plane. Over at least a portion of a surface area of the plate the corrugations are arranged in sub-regions that have a longitudinal length and the corrugations of each sub region are at the same angle relative to the longitudinal centerline, while the corrugations of adjacent sub-regions are at different angles from each other. In at least some implementations, the corrugations in adjacent sub-regions meet at junctions and the junctions are not longitudinally aligned. That is, the longitudinal centerline or a line parallel to the longitudinal centerline does not include all of the junctions between two adjacent sub-regions. In at least some implementations, the reference plane is parallel to both the longitudinal centerline and a lateral direction perpendicular to the longitudinal centerline, and the junctions of the adjacent sub-regions are arranged with some on one side and some on another side of an imaginary line parallel to the longitudinal centerline and extending along the reference plane.

The plate may include an inlet area from which fluid enters the flow channels defined by the corrugations, a heat transfer zone and a distribution zone located between the inlet area and the heat transfer zone. The distribution zone may include a primary distribution region with corrugations that at least partially define flow channels that extend across a lateral extent of the plate. And the distribution zone may include at least one secondary distribution region that has corrugations that at least partially define flow channels that include a transition at a non-zero angle from the flow channels defined by the corrugations in the primary distribution region and a portion that extends parallel to or within 10 degrees of parallel to the longitudinal centerline. In at least some implementations, the flow channels in the secondary distribution region(s) become longer the farther they are from the longitudinal centerline. This may help to direct fluid laterally farther from the inlet opening or inlet area of the plate to allow fluid to flow across a greater lateral extent of the plate over a greater longitudinal length of the plate. Each secondary distribution region may extend less than half of lateral extent of plate. In at least some implementations, the plate includes an inlet opening that at least partially defines an inlet area of the plate and each secondary distribution region(s) extends laterally less than the lateral extent of the inlet opening.

In at least some implementations, a plate for a heat exchanger has a longitudinal centerline, a reference plane parallel to the longitudinal centerline, corrugations that extend at an angle to the reference plane and define flow channels through which fluid flows, an inlet area defined at least in part by the plate via which fluid is introduced into the flow channels, and a distribution zone located adjacent to the inlet area and including corrugations that extend from the inlet area both longitudinally and laterally away from the inlet area where laterally is perpendicular to the longitudinal centerline. The corrugations in the distribution zone define at least two flow channels with different cross-sectional areas. The inlet area may be defined, for example, by an opening through the plate or by a gap or opening between two plates in a cassette or between adjacent plates in adjacent cassettes, as desired.

In at least some implementations, the cross-sectional area of the flow channels changes across the lateral extent of the plate with at least some of the flow channels that extend laterally farther from the inlet area having a greater cross-sectional area than some of the flow channels that do not extend as far laterally from the inlet area. In at least some implementations, the corrugations extend to peaks that are at the same distance from reference plane.

In at least some implementations, a plate for a heat exchanger has a longitudinal centerline, a reference plane parallel to the longitudinal centerline, corrugations that extend at an angle to the reference plane and define flow channels through which fluid flows, an inlet area defined at least in part by the plate via which fluid is introduced into the flow channels, a distribution zone located adjacent to the inlet area and including corrugations that extend from the inlet area both longitudinally and laterally away from the inlet area where laterally is perpendicular to the longitudinal centerline, and a heat transfer zone longitudinally adjacent to the distribution zone. The heat transfer zone includes corrugations that are arranged so that an imaginary line drawn anywhere along the lateral extent of the heat transfer zone and parallel to the longitudinal centerline will intersect corrugations arranged at at least two different angles relative to the imaginary line. In at least some implementations, the corrugations in the heat transfer zone are arranged in sub-regions that have a longitudinal length and the corrugations of each sub region are at the same angle relative to the longitudinal centerline while the corrugations of adjacent sub-regions are at different angles from each other. In at least some implementations, the imaginary line will intersect at least two different sub-regions. In at least some implementations, the corrugations of different sub-regions meet at junctions and the junctions between two sub-regions are not aligned longitudinally. Further, in at least some implementations, the junctions do not include corrugations from four different angles. This avoid a diamond, X or + shaped intersection, or the like, which during formation may result in an undesirable movement of material at the intersection which may affect the strength of that section of the plate and/or cause the plate to bow, warp or bend in that area.

The corrugations may be used to provide structural support for an area of the plate, to cause increased heat transfer between the fluids and the plates, and/or to direct or distribute fluid flow in a desired manner across the plate. While the same term "corrugations" is used herein to refer to the various non-planar features in the various regions of the plate, the corrugations may have different primary purposes in the different regions, and different ones of the corrugations in each region may have a different primary purpose.

The forms of the invention herein disclosed constitute presently preferred embodiments and many other forms and embodiments are possible. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:

1. A plate for a heat exchanger having a longitudinal centerline, a reference plane parallel to the longitudinal centerline, and multiple corrugations provided in the plate that define flow channels through which fluid flows, at least some of the corrugations are intersected by the reference plane, wherein over a portion of a surface area of the plate at least some of the corrugations are arranged in sub-regions that have a longitudinal length and the corrugations of each sub region are at the same angle relative to the longitudinal centerline, and the corrugations of adjacent sub-regions are at different angles from each other, and wherein the corrugations in adjacent sub-regions meet at junctions and the junctions are not longitudinally aligned and are arranged so that an imaginary straight line cannot be drawn that includes or intersects each junction between any two adjacent sub-regions.

2. The plate of claim 1 wherein a lateral direction is defined perpendicular to the longitudinal centerline and the reference plane is parallel to both the lateral direction and longitudinal centerline, and wherein the junctions of the adjacent sub-regions are arranged with some on one side and some on another side of an imaginary line parallel to the longitudinal centerline and extending along the reference plane.

3. The plate of claim 1 wherein the plate includes an inlet area from which fluid enters the flow channels defined by the corrugations, a heat transfer zone and distribution zone located between the inlet area and the heat transfer zone, wherein the distribution zone includes a primary distribution region with corrugations that at least partially define flow channels that extend across at least a portion of a lateral extent of the plate where the lateral extent is defined perpendicular to the longitudinal centerline, and the distribution zone includes at least one secondary distribution region located between the primary distribution region and the heat transfer zone, and wherein the secondary distribution region has corrugations that at least partially define flow channels that include a transition at a non-zero angle from the flow channels defined by the corrugations in the primary distribution region and that extend at an angle of at least 30 degrees relative to the longitudinal centerline.

4. The plate of claim 3 wherein the longitudinal dimension of the secondary distribution region is the same across the width of the plate.

5. The plate of claim 4 wherein the secondary distribution region includes multiple sections and each section extends less than one-third of the lateral extent of the plate.

6. The plate of claim 5 wherein each section of the multiple sections includes corrugations at a different angle than the sections immediately adjacent to said each section.

7. The plate of claim 1 which includes an inlet area via which fluid is introduced into the flow channels, and a distribution zone that is located adjacent to the inlet area and which includes corrugations that extend from the inlet area both longitudinally and laterally away from the inlet area where laterally is perpendicular to the longitudinal centerline, and wherein the corrugations in the distribution zone define at least two flow channels that have different cross-sectional areas.

8. The plate of claim 7 wherein the cross-sectional area of the flow channels changes across the lateral extent of the plate with at least some of the flow channels that extend laterally farther from the inlet area having a greater cross-sectional area than some of the flow channels that do not extend as far laterally from the inlet area.

9. The plate of claim 2 wherein the junctions are staggered so that some junctions are on one side of the longitudinal centerline and some junctions are on the other side of the longitudinal centerline.

10. The plate of claim 1 wherein the junctions are arranged so that a line intersecting the junctions crosses over an imaginary straight line multiple times.

11. The plate of claim 10 wherein the imaginary straight line is the longitudinal centerline or parallel to the longitudinal centerline.

12. A plate for a heat exchanger having a longitudinal centerline, a reference plane parallel to the longitudinal centerline, corrugations that extend at an angle relative to the longitudinal centerline and define flow channels through which fluid flows, an inlet area defined at least in part by the plate via which fluid is introduced into the flow channels, a distribution zone located adjacent to the inlet area and corrugations in the distribution zone extend from the inlet area both longitudinally and laterally away from the inlet area where laterally is perpendicular to the longitudinal centerline, and a heat transfer zone longitudinally adjacent to the distribution zone, wherein the heat transfer zone includes corrugations that are arranged so that an imaginary line drawn at any and every location along the lateral extent of the heat transfer zone and parallel to the longitudinal centerline will intersect with corrugations arranged at at least two different angles relative to the imaginary line, wherein the corrugations in the heat transfer zone are arranged in sub-regions that have a longitudinal length and the corrugations of each sub region are at the same angle relative to the longitudinal centerline, and the corrugations of adjacent sub-regions are at different angles from each other, and wherein the corrugations in adjacent sub-regions meet at junctions and the junctions are arranged so that an imaginary straight line cannot be drawn that includes or intersects each junction between adjacent sub-regions of all sub-regions.

13. The plate of claim 12 wherein the corrugations in the heat transfer zone are arranged in sub-regions that have a longitudinal length and the corrugations of each sub region are at the same angle relative to the longitudinal centerline, and the corrugations of adjacent sub-regions are at different angles from each other, and wherein the imaginary line will intersect at least two different sub-regions.

14. The plate of claim 13 wherein the corrugations of different sub-regions meet at junctions and the junctions between two sub-regions are not aligned longitudinally.

15. The plate of claim 14 wherein the junctions do not include corrugations from four different angles.

\* \* \* \* \*